United States Patent
Bergl et al.

(10) Patent No.: US 8,670,987 B2
(45) Date of Patent: Mar. 11, 2014

(54) AUTOMATIC SPEECH RECOGNITION WITH DYNAMIC GRAMMAR RULES

(75) Inventors: Vladimir Bergl, Praha (CZ); Charles W. Cross, Wellington, FL (US); Frank Jania, Chapel Hill, NC (US)

(73) Assignee: Nuance Communications, Inc., Burlington, MA (US)

( * ) Notice: Subject to any disclaimer, the term of this patent is extended or adjusted under 35 U.S.C. 154(b) by 1780 days.

(21) Appl. No.: 11/688,334

(22) Filed: Mar. 20, 2007

(65) Prior Publication Data
US 2008/0235022 A1 Sep. 25, 2008

(51) Int. Cl.
G10L 15/22 (2006.01)
G10L 15/18 (2013.01)

(52) U.S. Cl.
USPC .......................................... 704/275; 704/270

(58) Field of Classification Search
USPC ................................................. 704/270, 275
See application file for complete search history.

(56) References Cited

U.S. PATENT DOCUMENTS

| | | | |
|---|---|---|---|
| 5,577,165 A | 11/1996 | Takebayashi et al. | |
| 5,584,052 A | 12/1996 | Galau et al. | |
| 5,969,717 A | 10/1999 | Ikemoto | |
| 6,208,972 B1 | 3/2001 | Grant et al. | |
| 6,243,375 B1 | 6/2001 | Speicher | |
| 6,275,806 B1 | 8/2001 | Pertrushin | |
| 6,301,560 B1 | 10/2001 | Masters | |
| 6,374,226 B1 * | 4/2002 | Hunt et al. | 704/275 |
| 6,434,529 B1 * | 8/2002 | Walker et al. | 704/275 |
| 6,513,011 B1 | 1/2003 | Uwakubo | |
| 6,606,599 B2 | 8/2003 | Grant et al. | |
| 6,856,960 B1 | 2/2005 | Dragosh et al. | |
| 6,920,425 B1 | 7/2005 | Will et al. | |
| 6,999,930 B1 | 2/2006 | Roberts et al. | |

(Continued)

FOREIGN PATENT DOCUMENTS

| | | |
|---|---|---|
| CN | 1385783 | 12/2002 |
| CN | 1385783 A | 12/2002 |

(Continued)

OTHER PUBLICATIONS

W3C, "Speech Recognition Grammar Specification", Version 1.0, published on Mar. 16, 2004, [online], URL: http://www.w3.org/TR/speech-grammar, retrieved from http://www.archive.org, archived on Jan. 5, 2006.*

(Continued)

*Primary Examiner* — Jialong He
(74) *Attorney, Agent, or Firm* — Wolf, Greenfield & Sacks, P.C.

(57) ABSTRACT

Automatic speech recognition implemented with a speech recognition grammar of a multimodal application in an ASR engine, the multimodal application operating on a multimodal device supporting multiple modes of user interaction including a voice mode, the multimodal application operatively coupled to the ASR engine, including: matching by the ASR engine at least one static rule of the speech recognition grammar with at least one word of a voice utterance, yielding a matched value, the matched value specified by the grammar to be required for processing of a dynamic rule of the grammar; and dynamically defining at run time the dynamic rule of the grammar as a new static rule in dependence upon the matched value, the dynamic rule comprising a rule that is specified by the grammar as a rule that is not to be processed by the ASR until after the at least one static rule has been matched.

15 Claims, 5 Drawing Sheets

(56) References Cited

U.S. PATENT DOCUMENTS

| | | | |
|---|---|---|---|
| 7,003,457 B2* | 2/2006 | Halonen et al. | 704/235 |
| 7,035,805 B1 | 4/2006 | Miller | |
| 7,171,243 B2 | 1/2007 | Watanabe et al. | |
| 7,188,067 B2 | 3/2007 | Grant et al. | |
| 7,330,890 B1 | 2/2008 | Partovi et al. | |
| 7,376,586 B1 | 5/2008 | Partovi et al. | |
| 7,457,397 B1* | 11/2008 | Saylor et al. | 379/88.17 |
| 7,487,085 B2 | 2/2009 | Cross | |
| 7,493,260 B2* | 2/2009 | Harb et al. | 704/270 |
| 7,509,659 B2 | 3/2009 | McArdle | |
| 7,689,420 B2* | 3/2010 | Paek et al. | 704/257 |
| 2002/0065944 A1 | 5/2002 | Hickey et al. | |
| 2002/0092019 A1 | 7/2002 | Marcus | |
| 2002/0099553 A1 | 7/2002 | Brittan et al. | |
| 2002/0120554 A1 | 8/2002 | Vega | |
| 2002/0143529 A1* | 10/2002 | Schmid et al. | 704/231 |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0071833 A1* | 4/2003 | Dantzig et al. | 345/700 |
| 2003/0101451 A1 | 5/2003 | Bentolila et al. | |
| 2003/0125945 A1 | 7/2003 | Doyle | |
| 2003/0171926 A1* | 9/2003 | Suresh et al. | 704/270.1 |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0216923 A1* | 11/2003 | Gilmore et al. | 704/270.1 |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0006474 A1* | 1/2004 | Gong et al. | 704/270.1 |
| 2004/0019487 A1 | 1/2004 | Kleindienst et al. | |
| 2004/0025115 A1 | 2/2004 | Sienel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Farrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt | |
| 2005/0091059 A1 | 4/2005 | Lecoeuche | |
| 2005/0131701 A1 | 6/2005 | Cross | |
| 2005/0131702 A1* | 6/2005 | Bodin et al. | 704/270.1 |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1* | 6/2006 | Lee et al. | 715/809 |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0061146 A1* | 3/2007 | Jaramillo et al. | 704/270 |
| 2007/0213984 A1* | 9/2007 | Ativanichayaphong et al. | 704/257 |
| 2007/0265851 A1 | 11/2007 | Ben-David et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Ativanichayaphong et al. | |
| 2008/0162136 A1 | 7/2008 | Ativanichayaphong et al. | |
| 2008/0177530 A1 | 7/2008 | Cross et al. | |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |

FOREIGN PATENT DOCUMENTS

| | | |
|---|---|---|
| CN | 1564123 A | 1/2005 |
| EP | 0794670 A | 9/1997 |
| EP | 1450350 | 8/2004 |
| GB | 0507148.5 | 4/2005 |
| JP | 2000/155529 | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO 2006/108795 A1 | 10/2006 |
| WO | WO2006108795 | 10/2006 |

OTHER PUBLICATIONS

Nuance, "Nuance Grammar Developers Guide", [online], Published 2001. retrieved from http://community.voxeo.com/library/grammar, archived by http://www.archive.org on Oct. 2, 2003.*

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the

(56) References Cited

OTHER PUBLICATIONS

Internet: URL:http://www.w3.org/TR/2005/CR-voicexml21-20050613/ [retrieved on Jun. 12, 2008].
Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.
U.S. Appl. No. 10/924,520, filed Aug. 24, 2004, Charles W. Cross, Jr.
U.S. Appl. No. 10/945,112, filed Sep. 20, 2004, Charles W. Cross, Jr.
U.S. Appl. No. 10/870,517, filed Jun. 17, 2004, Charles W. Cross, Jr.
U.S. Appl. No. 10/441,839, filed May 20, 2003, S. Ativanichayaphong.
U.S. Appl. No. 11/062,731, filed Feb. 22, 2005, David Jaramillo.
U.S. Appl. No. 11/007,830, filed Dec. 8, 2004, Charles W. Cross, Jr.
U.S. Appl. No. 10/945,119, filed Sep. 20, 2004, Charles W. Cross, Jr.
U.S. Appl. No. 11/022,464, filed Dec. 22, 2004, Charles W. Cross, Jr.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross, Jr.
U.S. Appl. No. 10/849,642, filed May 19, 2004, Charles W. Cross, Jr.
U.S. Appl. No. 10/992,979, filed Nov. 19, 2004, Charles W. Cross, Jr.
U.S. Appl. No. 10/733,610, filed Dec. 11, 2003, Charles W. Cross, Jr.
U.S. Appl. No. 10/919,005, filed Dec. 2005, Eichenberger, et al.
U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
International Search Report and Written Opinion for International application No. PCT/EP2008/051358 mailed Jun. 25, 2008.
International Search Report and Written Opinion for International application No. PCT/EP2008/051363 mailed Jun. 18, 2008.

\* cited by examiner

AUTOMATIC SPEECH RECOGNITION WITH DYNAMIC GRAMMAR RULES

BACKGROUND OF THE INVENTION

1. Field of the Invention

The field of the invention is data processing, or, more specifically, methods, apparatus, and products for automatic speech recognition.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should 'say.' Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current lightweight voice solutions require a developer to build a grammar and lexicon to limit the potential number of words that an automated speech recognition ('ASR') engine must recognize—as a means for increasing accuracy. Pervasive devices have limited interaction and input modalities due to the form factor of the device, and kiosk devices have limited interaction and input modalities by design. In both cases the use of speaker independent voice recognition is implemented to enhance the user experience and interaction with the device. The state of the art in speaker independent recognition allows for some sophisticated voice applications to be written as long as there is a limited vocabulary associated with each potential voice command. For example, if the user is prompted to speak the name of a city the system can, with a good level of confidence, recognize the name of the city spoken.

Computer applications that employ speech user interface with finite state grammars need to be able to build those grammars dynamically based on the user's interaction with the application. Dynamically built grammars can use the current context of the application to build a grammar that is smaller and more apropos to the context, resulting in higher performance and increased accuracy of speech recognition. An example of this principle would be an application that prompts for a user's home location, including city and state. By asking for state first, the application can dynamically build a city grammar consisting only of the cities in the state chose first by the user.

This pattern of user interaction, however, suffers from being stilted and unnatural owing to the two steps of first obtaining state and then the city. The more natural interaction is to allow the user to say "Boca Raton Florida" and recognize both city and state from a single utterance. Depending on the application, however, the static grammar required to support the single utterance may be larger than can be supported by the available computing resources. Building a grammar to support recognition of a city and state from a single utterance, for example, may require building a grammar containing all the cities in the United States, a grammar may be too voluminous for use on many multimodal devices.

SUMMARY OF THE INVENTION

Methods, apparatus, and computer program products are described for automatic speech recognition, the method implemented with a speech recognition grammar of a multimodal application in an automatic speech recognition ('ASR') engine with the multimodal application operating on a multimodal device supporting multiple modes of user interaction with the multimodal application, the modes of user interaction including a voice mode and one or more non-voice modes, the multimodal application operatively coupled to the ASR engine, including: matching by the ASR engine at least one static rule of the speech recognition grammar with at least one word of a voice utterance, yielding at least one matched value, the matched value specified by the grammar to be required for processing of a dynamic rule of the grammar; and dynamically defining at run time the dynamic rule of the grammar as a new static rule in dependence upon the matched value, the dynamic rule comprising a rule that is specified by the grammar as a rule that is not to be processed by the ASR until after the at least one static rule has been matched.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
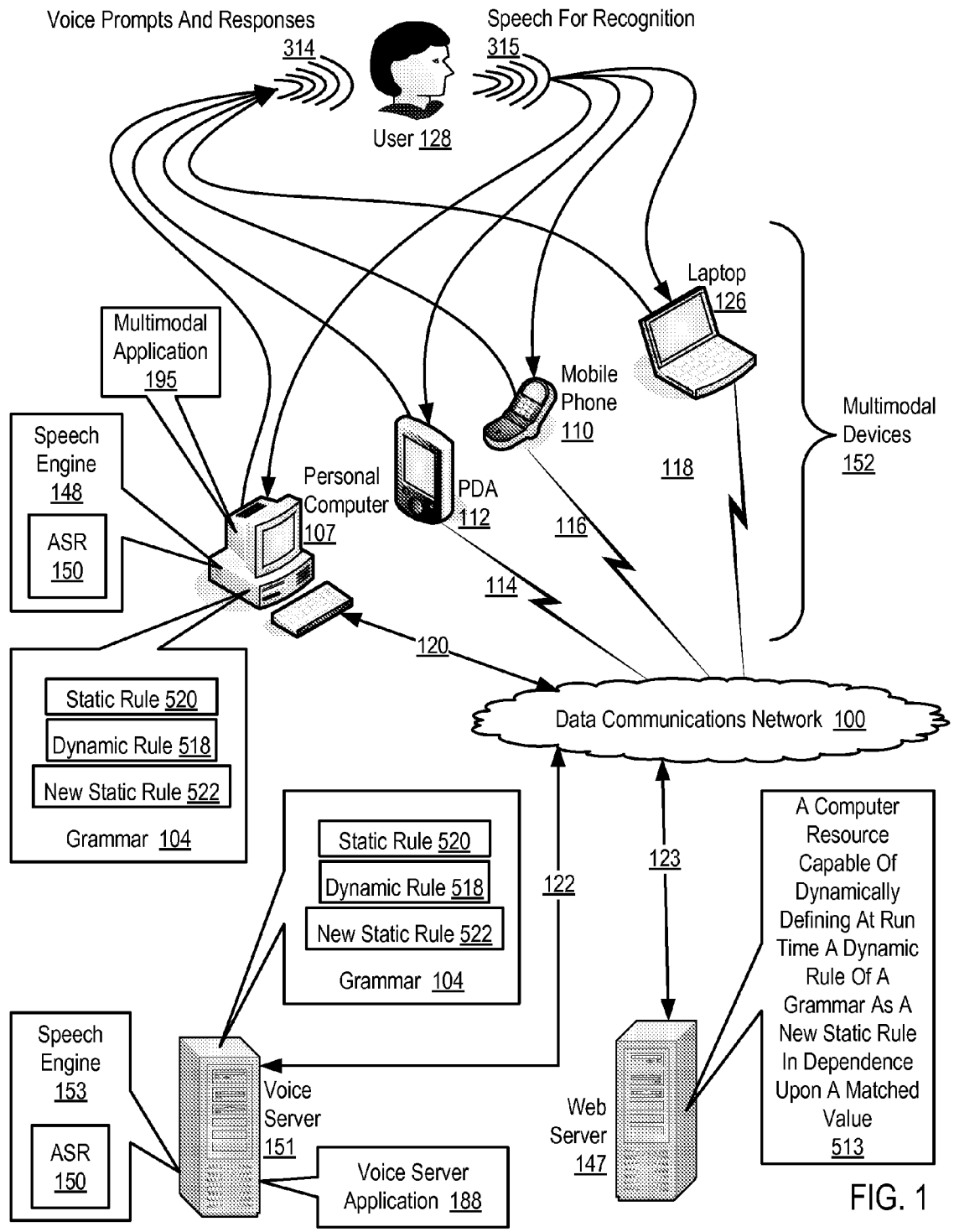
FIG. 1 sets forth a network diagram illustrating an exemplary system for automatic speech recognition according to embodiments of the present invention.

Exemplary methods, apparatus, and products for automatic speech recognition according to embodiments of the present invention are described with reference to the accompanying drawings, beginning with FIG. 1. FIG. 1 sets forth a network diagram illustrating an exemplary system for automatic speech recognition according to embodiments of the present invention. Automatic speech recognition in this example is implemented with a multimodal application (195) operating on a multimodal device (152). The system of FIG. 1 includes at least one speech recognition grammar (104) that specifies words and phrases to be recognized by an automatic speech recognition ('ASR') engine (150) of a speech engine (148, 153). The multimodal device (152) supports multiple modes of user interaction with the multimodal application including a voice mode and one or more non-voice modes of user interaction with the multimodal application. The voice mode is represented here with audio output of voice prompts and responses (177) from the multimodal devices and audio input of speech for recognition (315) from a user (128). Non-voice modes are represented by input/output devices such as keyboards and display screens on the multimodal devices (152). The multimodal application is operatively coupled (195) to an ASR engine (150) in a speech engine (148). The operative coupling may be implemented with an application programming interface ('API'), a voice service module, or a VOIP connection as explained more detail below.

The system of FIG. 1 operates generally to carry out automatic speech recognition according to embodiments of the present invention by matching by an ASR engine (150) at least one static rule (520) of a speech recognition grammar (104) with at least one word of a user's voice utterance, yielding at least one matched value. The matched value is specified by the grammar to be required for processing of a dynamic rule (518) of the grammar. The dynamic rule of the grammar is dynamically defined at run time as a new static rule (522) in dependence upon the matched value. The dynamic rule is a rule that is specified by the grammar as a rule that is not to be processed by the ASR engine until after the at least one static rule has been matched.

The grammar (104) in the example of FIG. 1 includes a static grammar rule (520), a dynamic grammar rule (518), and a new static grammar rule (522) that is generated dynamically at run time by use of a definition of the dynamic rule and a matched value of the static rule (520). Grammar rules are components of a speech recognition grammar that advise an ASR engine or a voice interpreter which words presently can be recognized. The follow grammar, for example:

```
<grammar>
    <command> = [remind me to] call | phone | telephone <name>
        <when>;
    <name> = bob | martha | joe;
        <when> = today | this afternoon;
</grammar>
``` contains three rules named respectively <command>, <name>, and <when>. The elements <name> and <when> inside the <command> rule are references to the rules named <name> and <when>. Such rule references require that the referenced rules must be matched by an ASR engine in order for the referring rule to be matched. In this example, therefore, the <name> rule and the <when> rule must both be matched by an ASR engine with speech from a user utterance in order for the <command> rule to be matched. The rules just above are 'static' grammar rules, that are in this example at least, equivalent to traditional rules of a voice recognition grammar. According to embodiments of the present invention, however, 'static' rules, unlike traditional grammar rules, can also include dynamic rule references. Also according to embodiments of the present invention, a grammar may contain dynamic rules, rules that are specified by the grammar as a rule that is not to be processed by the ASR until after the at least one static rule has been matched. Such dynamic rules are dynamically defined at run time as a new static rule in dependence upon a matched value of a previously matched static rule. The following grammar, for example:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>
``` uses a double-bracket syntax and a parameter list to specify the <<brand>> rule as a dynamic rule that is not to be processed by an ASR until after the <item> rule has been matched. In this <<brand>> example, the static <command> rule contains a rule reference:

<<brand>>(<item>)

that is specified by the grammar's double-bracket syntax to be a dynamic rule reference to the dynamic <<brand>> rule. The dynamic rule reference <<brand>> is characterized by a static rule parameter list (<item>) that includes a one static rule reference <item> specifying a static rule, here named <item>, required to be matched by the ASR engine before processing the dynamic rule <<brand>>. The parameter list (<item>) is attached to the <<brand>> rule in a manner reminiscent of the parameter list in a traditional C-style function call. In this example, there is only one entry in the parameter list, <item>, but the list could contain any number of rule references. The <command> and <item> rules are said to be 'static' rules in that they are traditional rules of a voice recognition grammar. That is, the term 'static' is used in this specification to refer to any rule of a grammar that is not a dynamic rule according to embodiments of the present invention.

The dynamic <<brand>> rule is initially defined in this example grammar only by a URL:

<<brand>>=http://groceries.com/brand.jsp

The URL identifies a computer resource capable of dynamically defining at run time the dynamic <<brand>> rule of the grammar as a new static rule in dependence upon matched value from the <item> rule, the rule required to be matched before the dynamic rule is processed. In this example, the computer resource so identified is a Java Server Page ('JSP') located at http://groceries.com. The JSP is a computer resource that is programmed to define the dynamic <<brand>> rule of the grammar as a new static rule in dependence upon matched value from the <item> rule. The ASR engine expands the definition of the <<brand>> rule with the results of the match from the <item> rule and provides the expansion to the JSP page to return a new static rule. In this way, the ASR engine may dynamically define the dynamic rule at run time as a new static rule by expanding the definition of the dynamic rule with a matched value of the referenced static <item> rule. If the <item> rule were matched with "peppers," for example, then the definition of the dynamic <<brand>> rule may be expanded as:

http://groceries.com/brand.jsp?item="peppers"

And the new static rule returned from the JSP page may be, for example:

<brand>=brand a|brand b|brand c

If the <item> rule were matched with "tomatoes," for example, then the definition of the dynamic <<brand>> rule may be expanded as:

http://groceries.com/brand.jsp?item="tomatoes"

And the new static rule returned from the JSP page may be, for example:

<brand>=brand f|brand g|brand h

If the <item> rule were matched with "toothpaste," for example, then the definition of the dynamic <<brand>> rule may be expanded as:

http://groceries.com/brand.jsp?item="toothpaste"

And the new static rule returned from the JSP page may be, for example:

<brand>=colgate|palmolive|crest

And so on—with a different definition of the new static rule possible for each matched value of the referenced static <item> rule.

Note that in this example, the dynamic <<brand>> rule occurs in document order after the static <item> rule whose match value is required before the dynamic rule can be processed. In this example, the ASR engine typically will match the <item> rule in document order before processing the <<brand>> rule. This document order, however, is not a limitation of the present invention. The static and dynamic rules may occur in any document order in the grammar, and, if a dynamic rule is set forth in the grammar ahead of a static rule upon which the dynamic rule depends, then the ASR engine is configured to make more than one pass through the grammar, treating the dynamic rule in the meantime as a rule that matches any speech in the utterance until a next rule match, a next token match, or the end of processing of the pertinent user utterance.

A multimodal device is an automated device, that is, automated computing machinery or a computer program running on an automated device, that is capable of accepting from users more than one mode of input, keyboard, mouse, stylus, and so on, including speech input—and also displaying more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice browser on a telephone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:

personal computer (107) which is coupled for data communications to data communications network (100) through wireline connection (120), personal digital assistant ('PDA') (112) which is coupled for data communications to data communications network (100) through wireless connection (114), mobile telephone (110) which is coupled for data communications to data communications network (100) through wireless connection (116), and laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Speech for automatic speech recognition according to embodiments of the present invention may be encoded with any codec, including, for example:

AMR (Adaptive Multi-Rate Speech coder)
ARDOR (Adaptive Rate-Distortion Optimized sound codeR),
Dolby Digital (A/52, AC3),
DTS (DTS Coherent Acoustics),
MP1 (MPEG audio layer-1),
MP2 (MPEG audio layer-2) Layer 2 audio codec (MPEG-1, MPEG-2 and non-ISO MPEG-2.5),
MP3 (MPEG audio layer-3) Layer 3 audio codec (MPEG-1, MPEG-2 and non-ISO MPEG-2.5),
Perceptual Audio Coding,
FS-1015 (LPC-10),
FS-1016 (CELP),
G.726 (ADPCM),
G.728 (LD-CELP),
G.729 (CS-ACELP),
GSM,
HILN (MPEG-4 Parametric audio coding), and
others as may occur to those of skill in the art.

As mentioned, a multimodal device according to embodiments of the present invention is capable of providing speech to a speech engine for recognition. A speech engine is a functional module, typically a software module, although it may include specialized hardware also, that does the work of recognizing and generating or 'synthesizing' human speech. The speech engine implements speech recognition by use of a further module referred to in this specification as a ASR engine, and the speech engine carries out speech synthesis by use of a further module referred to in this specification as a text-to-speech ('TTS') engine. As shown in FIG. 1, a speech engine (148) may be installed locally in the multimodal device (107) itself, or a speech engine (153) may be installed remotely with respect to the multimodal device, across a data communications network (100) in a voice server (151). A multimodal device that itself contains its own speech engine is said to implement a 'thick multimodal client' or 'thick client,' because the thick multimodal client device itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin multimodal client' or simply a 'thin client,' because the thin multimodal client itself contains only a relatively thin layer of multimodal application software that obtains speech recognition and speech synthesis services from a voice server located remotely across a network from the thin client. For ease of explanation, only one (107) of the multimodal devices (152) in the system of FIG. 1 is shown with a speech engine (148), but readers will recognize that any multimodal device may have a speech engine according to embodiments of the present invention.

A multimodal application (195) in this example provides speech for recognition and text for speech synthesis to a speech engine through a VoiceXML interpreter (149, 155). A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA').

As shown in FIG. 1, a VoiceXML interpreter (149) may be installed locally in the multimodal device (107) itself, or a VoiceXML interpreter (155) may be installed remotely with respect to the multimodal device, across a data communications network (100) in a voice server (151). In a thick client architecture, a multimodal device (152) includes both its own speech engine (148) and its own VoiceXML interpreter (149). The VoiceXML interpreter (149) exposes an API to the multimodal application (195) for use in providing speech recognition and speech synthesis for the multimodal application. The multimodal application provides dialog instructions, VoiceXML <form> elements, grammars, input elements, event handlers, and so on, through the API to the VoiceXML interpreter, and the VoiceXML interpreter administers the speech engine on behalf of the multimodal application. In the thick client architecture, VoiceXML dialogs are interpreted by a VoiceXML interpreter on the multimodal device. In the thin client architecture, VoiceXML dialogs are interpreted by a VoiceXML interpreter on a voice server (151) located remotely across a data communications network (100) from the multimodal device running the multimodal application (195).

The VoiceXML interpreter provides grammars, speech for recognition, and text prompts for speech synthesis to the speech engine, and the VoiceXML interpreter returns to the multimodal application speech engine output in the form of recognized speech, semantic interpretation results, and digitized speech for voice prompts. In a thin client architecture, the VoiceXML interpreter (155) is located remotely from the multimodal client device in a voice server (151), the API for the VoiceXML interpreter is still implemented in the multimodal device, with the API modified to communicate voice dialog instructions, speech for recognition, and text and voice prompts to and from the VoiceXML interpreter on the voice server. For ease of explanation, only one (107) of the multimodal devices (152) in the system of FIG. 1 is shown with a VoiceXML interpreter (149), but readers will recognize that any multimodal device may have a VoiceXML interpreter according to embodiments of the present invention. Each of the example multimodal devices (152) in the system of FIG. 1 may be configured to carry out automatic speech recognition by installing and running on the multimodal device a multimodal application that carries out automatic speech recognition with dynamic grammar rules according to embodiments of the present invention.

The use of these four example multimodal devices (152) is for explanation only, not for limitation of the invention. Any automated computing machinery capable of accepting speech from a user, providing the speech digitized to an ASR engine through a VoiceXML interpreter, and receiving and playing speech prompts and responses from the VoiceXML interpreter may be improved to function as a multimodal device for automatic speech recognition according to embodiments of the present invention.

The system of FIG. 1 also includes a voice server (151) which is connected to data communications network (100) through wireline connection (122). The voice server (151) is a computer that runs a speech engine (153) that provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152) and the voice server (151) for data communications. A data communications network for automatic speech recognition according to embodiments of the present invention is a data communications data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a VoiceXML interpreter (149) and speech engine (148) in the multimodal device itself or by use of a VoiceXML interpreter (155) and speech engine (153) located remotely from the multimodal device in a voice server (151).

The arrangement of the multimodal devices (152), the web server (147), the voice server (151), and the data communications network (100) making up the exemplary system illustrated in FIG. 1 are for explanation, not for limitation. Data processing systems useful for automatic speech recognition according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Automatic speech recognition according to embodiments of the present invention in a thin client architecture may be implemented with one or more voice servers, computers, that is, automated computing machinery, that provide speech recognition and speech synthesis. For further explanation, therefore, FIG. 2 sets forth a block diagram of automated computing machinery comprising an example of a computer useful as a voice server (151) in automatic speech recognition according to embodiments of the present invention. The voice server (151) of FIG. 2 includes at least one computer processor (156) or 'CPU' as well as random access memory (168) ('RAM') which is connected through a high speed memory bus (166) and bus adapter (158) to processor (156) and to other components of the voice server.

Stored in RAM (168) is a voice server application (188), a module of computer program instructions capable of operating a voice server in a system that is configured to carry out automatic speech recognition according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications. Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine (102) and supports a Java voice framework by providing responses to HTTP requests from Java client applications running on multimodal devices. And voice server applications that support automatic speech recognition may be implemented in other ways as may occur to those of skill in the art, and all such ways are well within the scope of the present invention.

The voice server (151) in this example includes a speech engine (153). The speech engine is a functional module, typically a software module, although it may include specialized hardware also, that does the work of recognizing and generating human speech. The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates SFVs with phonemes representing, to the extent that it is practically feasible to do so, all pronunciations of all the words in a human language. The lexicon (106) is an association of words in text form with phonemes representing pronunciations of each word; the lexicon effectively identifies words that are capable of recognition by an ASR engine. Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammar (104) communicates to the ASR engine (150) the words and sequences of words that currently may be recognized. For precise understanding, distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Grammars for use in automatic speech recognition according to embodiments of the present invention may be expressed in any format supported by any ASR engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSGF:

```
<grammar scope="dialog"><![CDATA[
    #JSGF V1.0;
    grammar command;
    <command> = [remind me to] call | phone | telephone <name>
    <when>;
    <name> = bob | martha | joe | pete | chris | john | artoush;
    <when> = today | this afternoon | tomorrow | next week;
    ]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'artoush', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a multimodal client located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192), a module of computer program instructions that processes VoiceXML grammars. VoiceXML input to VoiceXML interpreter (192) may originate, for example, from VoiceXML clients running remotely on multimodal devices, from X+V clients running remotely on multimodal devices, from SALT clients running on multimodal devices, or from Java client applications running remotely on multimedia devices. In this example, VoiceXML interpreter (192) interprets and executes VoiceXML segments representing voice dialog instructions received from remote multimedia devices and provided to VoiceXML interpreter (192) through voice server application (188).

A multimodal application (195) in a thin client architecture may provide voice dialog instructions, VoiceXML segments, VoiceXML <form> elements, and the like, to VoiceXML interpreter (149) through data communications across a network with multimodal application (195). The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). The VoiceXML interpreter interprets VoiceXML dialogs provided to the VoiceXML interpreter by a multimodal application.

Figure 2:
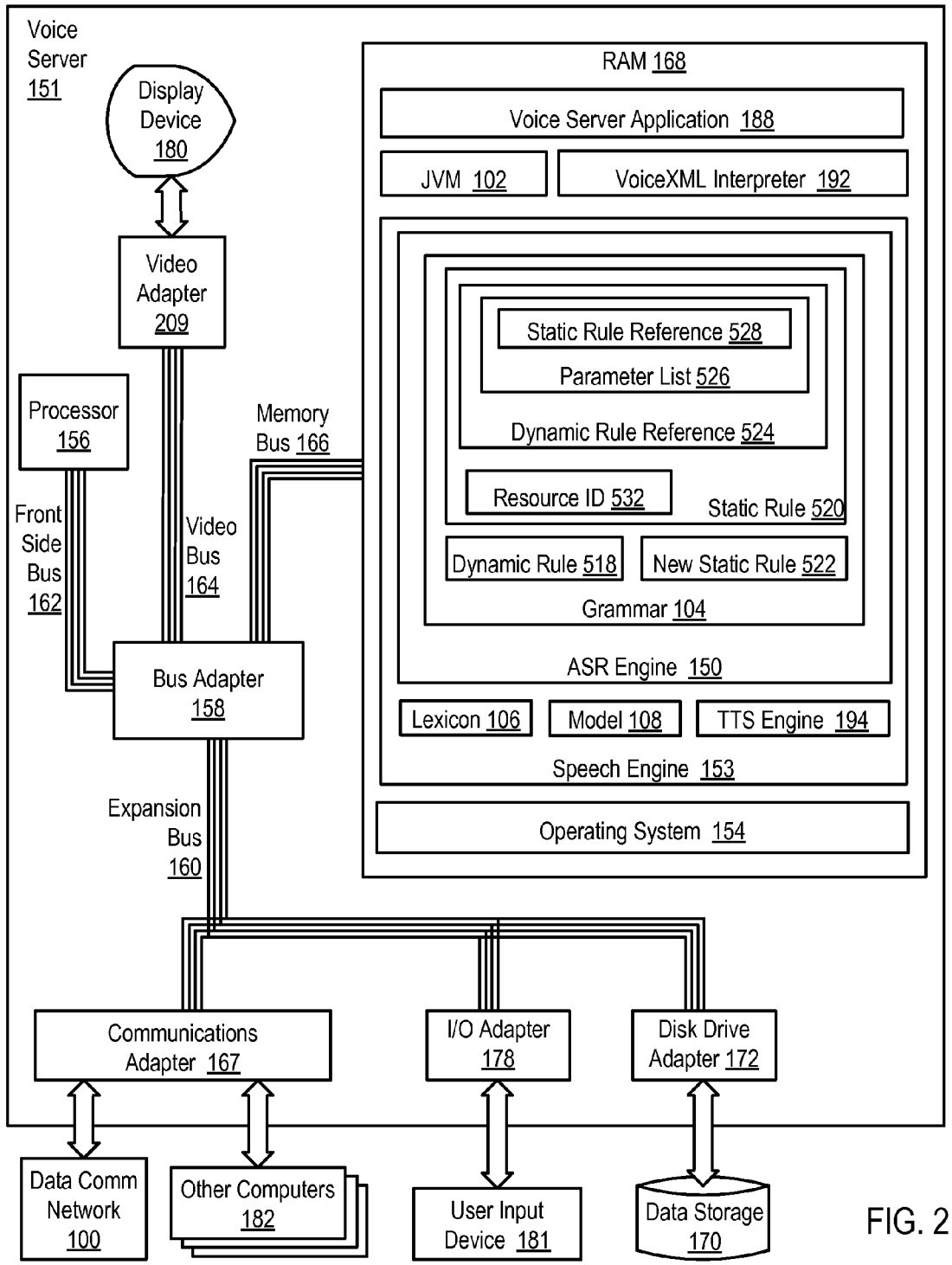
FIG. 2 sets forth a block diagram of automated computing machinery comprising an example of a computer useful as a voice server in automatic speech recognition according to embodiments of the present invention.

The speech recognition grammar (104) in the example of FIG. 2 includes a static grammar rule (520), a dynamic rule (518), and a new static rule (522) that is generated at run time from the dynamic rule (518) by use of a definition of the dynamic rule and a matched value of the static rule (520). The static rule (520) is a non-dynamic rule of the grammar that, unlike traditional grammar rules, can also include references to dynamic rules. The dynamic rule (518) is a rule that is specified by the grammar as a rule that is not to be processed by the ASR engine (150) until after the at least one static rule has been matched—yielding a matched value. The dynamic rule of the grammar is dynamically defined at run time as a new static rule (522) in dependence upon the matched value.

The static rule (520) contains a dynamic rule reference (524) that has a static rule parameter list (526) containing at least one static rule reference (528). The dynamic rule reference (524) identifies a dynamic rule (518) that must be matched in order for the static rule (520) to be matched. The at least one static rule reference (528) identifies at least one static rule that must be matched before the dynamic rule may be processed for a match by the ASR engine (150). In this example static rule:

<command>=add <<brand>>(<item>)<item> to my shopping list, the <<brand>> reference is dynamic rule reference (524) that has a static rule parameter list (<item>) that contains one static rule reference (528) to a static rule named <item>. In this example, the dynamic rule <<brand>> is coded with double brackets <<< >>> to advise the ASR engine that the dynamic rule must be matched before the static <command> rule can be matched, and the coding of the static rule parameter list (<item>) is coded with parentheses ( ) to advise the ASR engine (150) that the static <item> rule is to be matched before the dynamic <<brand>> rule is processed by the ASR engine.

The ASR engine (150) of FIG. 1 operates generally to carry out automatic speech recognition according to embodiments of the present invention by matching at least one static rule of a speech recognition grammar (104) with at least one word of a user's voice utterance, yielding at least one matched value, and dynamically defining at run time the dynamic rule of the grammar as a new static rule in dependence upon the matched value. The matched value is specified by the grammar to be required for processing of a dynamic rule (518) of the grammar. An example of a matched value in a static rule containing a dynamic rule reference for this example grammar:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>
``` is "peppers" when matched from a user utterance for the <item> rule. The matched value is specified by the grammar to be required for processing of the dynamic <<brand>> rule by the coding of the dynamic rule reference <<brand>> (<item>) in the static <command> rule.

The process of dynamically defining the dynamic rule as a new static rule may be carried out by the ASR engine (150) operating in conjunction with another computer resource that is specified in the definition of the dynamic rule (518) as a computer resource that is capable of dynamically defining at run time the dynamic rule of the grammar as a new static rule in dependence upon the matched value. In the exampleGrammar set forth above, the definition of the dynamic <<brand>> rule specifies the resource located by the URL http://groceries.com/brand.jsp as a computer resource that is capable of dynamically defining at run time the dynamic rule of the grammar as a new static rule in dependence upon a matched value of a static rule.

Also stored in RAM (168) is an operating system (154). Operating systems useful in voice servers according to embodiments of the present invention include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 2 are shown in RAM (168), but many components of such software typically are stored in non-volatile memory also, for example, on a disk drive (170).

Voice server (151) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in voice servers according to embodiments of the present invention include the Intel Northbridge, the Intel Memory Controller Hub, the Intel Southbridge, and the Intel I/O Controller Hub. Examples of expansion buses useful in voice servers according to embodiments of the present invention include Industry Standard Architecture ('ISA') buses and Peripheral Component Interconnect ('PCI') buses.

Voice server (151) of FIG. 2 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics ('IDE') adapters, Small Computer System Interface ('SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on, as will occur to those of skill in the art.

The example voice server of FIG. 2 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary voice server (151) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for automatic speech recognition according to embodiments of the present invention include modems for wired dial-up communications, Ethernet (IEEE 802.3) adapters for wired data communications network communications, and 802.11 adapters for wireless data communications network communications.

Figure 3:
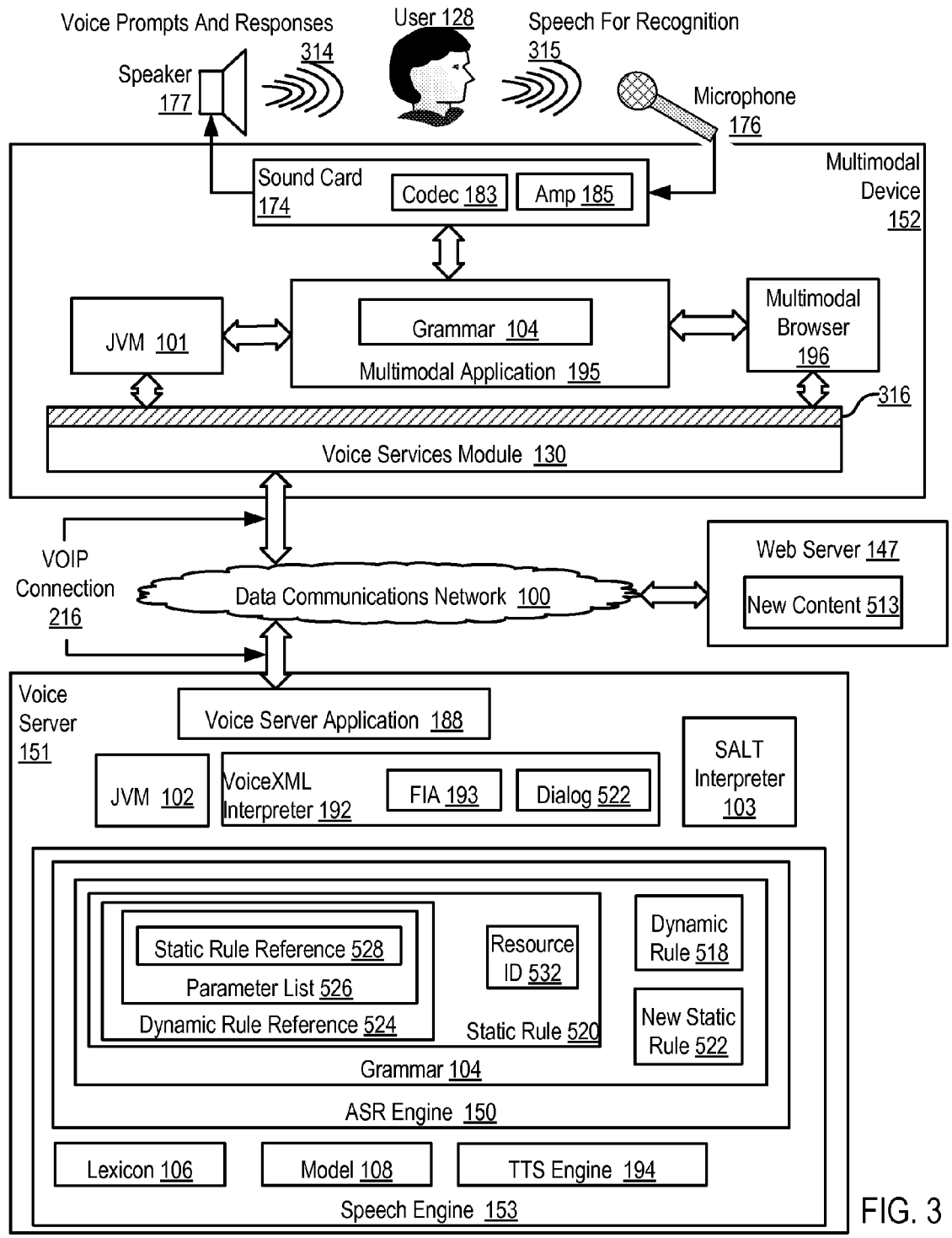
FIG. 3 sets forth a functional block diagram of exemplary apparatus for automatic speech recognition according to embodiments of the present invention.

For further explanation, FIG. 3 sets forth a functional block diagram of exemplary apparatus for automatic speech recognition in a thin client architecture according to embodiments of the present invention. The example of FIG. 3 includes a multimodal device (152) and a voice server (151) connected for data communication by a VOIP connection (216) through a data communications network (100). A multimodal application (195) runs on the multimodal device (152), and a voice server application (188) runs on the voice server (151). The multimodal client application (195) may be a set or sequence of X+V or SALT documents that execute on multimodal browser (196), a Java voice application that executes on the Java Virtual Machine (101), or a multimodal application implemented in other technologies as may occur to those of skill in the art. The example multimodal device of FIG. 3 also includes a sound card (174), which is an example of an I/O adapter specially designed for accepting analog audio signals from a microphone (176) and converting the audio analog signals to digital form for further processing by a codec (183).

In addition to the multimodal sever application (188), the voice server (151) also has installed upon it a speech engine (153) with an ASR engine (150), a grammar (104), a lexicon (106), a language-specific acoustic model (108), and a TTS engine (194), as well as a JVM (102), and a Voice XML interpreter (192). VoiceXML interpreter (192) interprets and executes VoiceXML dialog instructions received from the multimodal application and provided to VoiceXML interpreter (192) through voice server application (188). VoiceXML input to VoiceXML interpreter (192) may originate from the multimodal application (195) implemented as an X+V client running remotely on the multimodal device (152). As noted above, the multimedia device application (195) also may be implemented as a Java client application running remotely on the multimedia device (152), a SALT application running remotely on the multimedia device (152), and in other ways as may occur to those of skill in the art.

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols are used to effect VOIP. The two most popular types of VOIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 3 operates in a manner that is similar to the operation of the system of FIG. 2 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VOIP protocol, and transmits the speech to voice server (151) through the VOIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) includes computer program instructions that provide text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to VoiceXML interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The speech recognition grammar (104) in the example of FIG. 3 includes a static grammar rule (520), a dynamic rule (518), and a new static rule (522) that is generated at run time from the dynamic rule (518) by use of a definition of the dynamic rule and a matched value of the static rule (520). The static rule (520) is a non-dynamic rule of the grammar that, unlike traditional grammar rules, can also include references to dynamic rules. The dynamic rule (518) is a rule that is specified by the grammar as a rule that is not to be processed by the ASR engine (150) until after the at least one static rule has been matched—yielding a matched value. The dynamic rule of the grammar is dynamically defined at run time as a new static rule (522) in dependence upon the matched value.

The static rule (520) contains a dynamic rule reference (524) that has a static rule parameter list (526) containing at least one static rule reference (528). The dynamic rule reference (524) identifies a dynamic rule (518) that must be matched in order for the static rule (520) to be matched. The at least one static rule reference (528) identifies at least one static rule that must be matched before the dynamic rule may be processed for a match by the ASR engine (150). In this example static rule:

<command>=add <<brand>>(<item>)<item> to my shopping list, the <<brand>> reference is dynamic rule reference (524) that has a static rule parameter list (<item>) that contains one static rule reference (528) to a static rule named <item>. In this example, the dynamic rule <<brand>> is coded with double brackets <<< >>> to advise the ASR engine that the dynamic rule must be matched before the static <command> rule can be matched, and the coding of the static rule parameter list (<item>) is coded with parentheses ( ) to advise the ASR engine (150) that the static <item> rule is to be matched before the dynamic <<brand>> rule is processed by the ASR engine.

The ASR engine (150) of FIG. 1 operates generally to carry out automatic speech recognition according to embodiments of the present invention by matching at least one static rule of a speech recognition grammar (104) with at least one word of a user's voice utterance, yielding at least one matched value, and dynamically defining at run time the dynamic rule of the grammar as a new static rule in dependence upon the matched value. The matched value is specified by the grammar to be required for processing of a dynamic rule (518) of the grammar. An example of a matched value in a static rule containing a dynamic rule reference for this example grammar:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>
``` is "peppers" when matched from a user utterance for the <item> rule. The matched value is specified by the grammar to be required for processing of the dynamic <<brand>> rule by the coding of the dynamic rule reference <<brand>> (<item>) in the static <command> rule.

The process of dynamically defining the dynamic rule as a new static rule may be carried out by the ASR engine (150) operating in conjunction with another computer resource that is specified in the definition of the dynamic rule (518) as a computer resource that is capable of dynamically defining at run time the dynamic rule of the grammar as a new static rule in dependence upon the matched value. In the exampleGrammar set forth above, the definition of the dynamic <<brand>> rule specifies the resource located by the URL http://groceries.com/brand.jsp as a computer resource that is capable of dynamically defining at run time the dynamic rule of the grammar as a new static rule in dependence upon a matched value of a static rule.

The multimodal application (195) is operatively coupled to the ASR engine (150). In this example, the operative coupling between the multimodal application and the ASR engine (150) is implemented with a VOIP connection (216) through a voice services module (130), then through the voice server application (188) and either JVM (102), VoiceXML interpreter (192), or SALT interpreter (103), depending on whether the multimodal application is implemented in X+V, Java, or SALT. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195), JVM (101), and multimodal browser (196).

The voice services module (130) provides data communications services through the VOIP connection and the voice server application (188) between the multimodal device (152) and the VoiceXML interpreter (192). The API (316) is the same API presented to applications by a VoiceXML interpreter when the VoiceXML interpreter is installed on the multimodal device in a thick client architecture (316 on FIG. 4). So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 4:
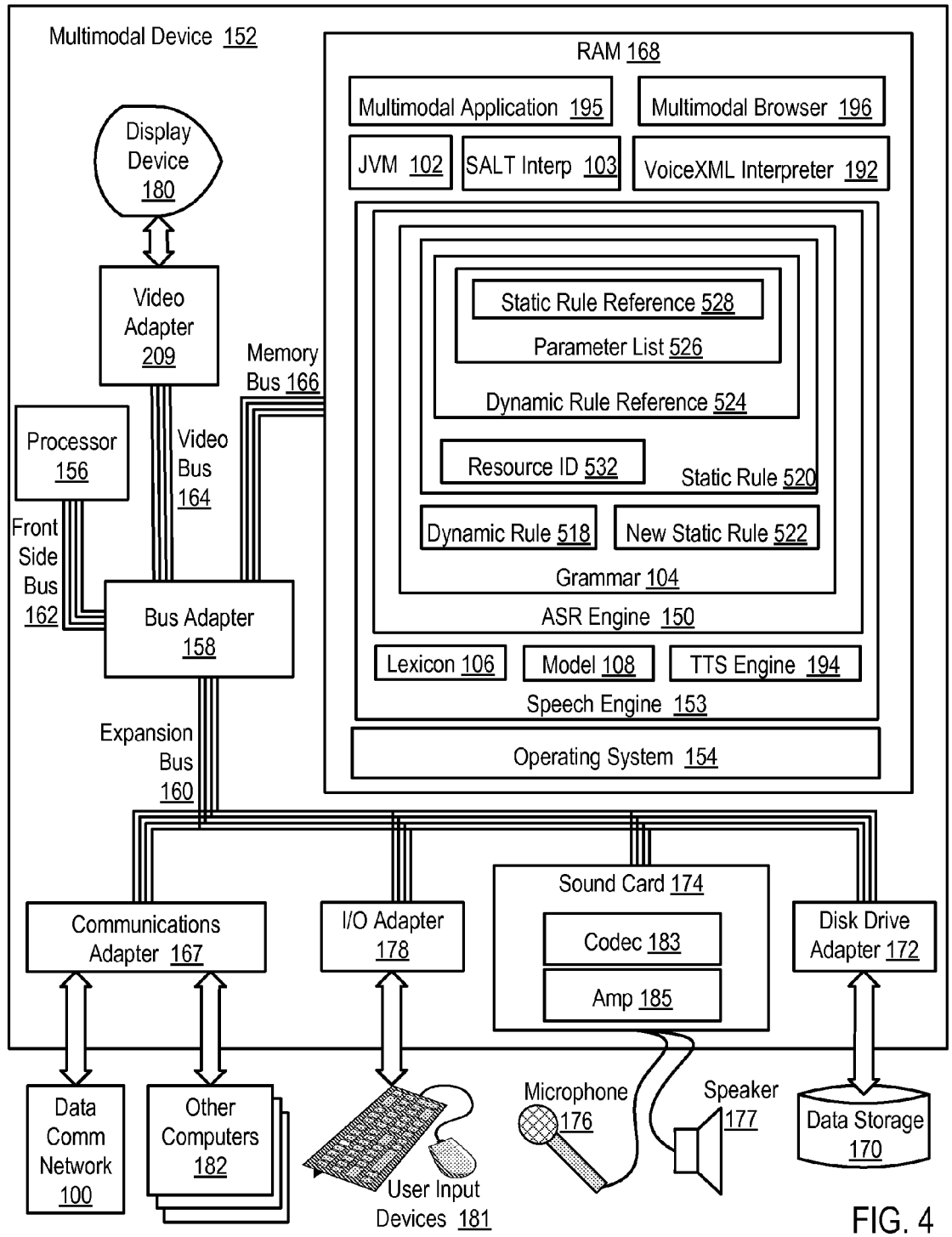
FIG. 4 sets forth a block diagram of automated computing machinery comprising an example of a computer useful as a multimodal device in automatic speech recognition according to embodiments of the present invention.

Automatic speech recognition according to embodiments of the present invention in thick client architectures is generally implemented with multimodal devices, that is, automated computing machinery or computers. In the system of FIG. 1, for example, all the multimodal devices (152) are implemented to some extent at least as computers. For further explanation, therefore, FIG. 4 sets forth a block diagram of automated computing machinery comprising an example of a computer useful as a multimodal device (152) in automatic speech recognition according to embodiments of the present invention. In a multimodal device implementing a thick client architecture as illustrated in FIG. 4, the multimodal device (152) has no connection to a remote voice server containing a VoiceXML interpreter and a speech engine. All the components needed for speech synthesis and voice recognition in automatic speech recognition according to embodiments of the present invention are installed or embedded in the multimodal device itself.

The example multimodal device (152) of FIG. 4 includes several components that are structured and operate similarly as do parallel components of the voice server, having the same drawing reference numbers, as described above with reference to FIG. 2: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a JVM (102), a VoiceXML Interpreter (192), a speech engine (153), and so on. As in the system of FIG. 4, the speech engine in the multimodal device of FIG. 2 includes an ASR engine (150), a grammar (104), a lexicon (106), a language-dependent acoustic model (108), and a TTS engine (194). The VoiceXML interpreter (192) administers such dialogs by processing the dialog instructions sequentially in accordance with a VoiceXML Form Interpretation Algorithm ('FIA') (193).

The speech engine (153) in this kind of embodiment, a thick client architecture, often is implemented as an embedded module in a small form factor device such as a handheld device, a mobile phone, PDA, and the like. An example of an embedded speech engine useful for automatic speech recognition according to embodiments of the present invention is IBM's Embedded ViaVoice Enterprise. The example multimodal device of FIG. 4 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports automatic speech recognition according to embodiments of the present invention. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal browser (196) or microbrowser that passes VoiceXML grammars and digitized speech by calls through an API (316) directly to an embedded VoiceXML interpreter (192) for processing. The embedded VoiceXML interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes on Java Virtual Machine (102) and issues calls through the VoiceXML API (316) for speech recognition and speech synthesis services. In further exemplary embodiments, the multimodal application (195) may be implemented as a set or sequence of SALT documents executed on a multimodal browser (196) or microbrowser that issues calls through the VoiceXML API (316) for speech recognition and speech synthesis services. In addition to X+V, SALT, and Java implementations, multimodal application (195) may be implemented in other technologies as will occur to those of skill in the art, and all such implementations are well within the scope of the present invention.

The speech recognition grammar (104) in the example of FIG. 4 includes a static grammar rule (520), a dynamic rule (518), and a new static rule (522) that is generated at run time from the dynamic rule (518) by use of a definition of the dynamic rule and a matched value of the static rule (520). The static rule (520) is a non-dynamic rule of the grammar that, unlike traditional grammar rules, can also include references to dynamic rules. The dynamic rule (518) is a rule that is specified by the grammar as a rule that is not to be processed by the ASR engine (150) until after the at least one static rule has been matched—yielding a matched value. The dynamic rule of the grammar is dynamically defined at run time as a new static rule (522) in dependence upon the matched value.

The static rule (520) contains a dynamic rule reference (524) that has a static rule parameter list (526) containing at least one static rule reference (528). The dynamic rule reference (524) identifies a dynamic rule (518) that must be matched in order for the static rule (520) to be matched. The at least one static rule reference (528) identifies at least one static rule that must be matched before the dynamic rule may be processed for a match by the ASR engine (150). In this example static rule:

<command>=add <<brand>>(<item>)<item> to my shopping list, the <<brand>> reference is dynamic rule reference (524) that has a static rule parameter list (<item>) that contains one static rule reference (528) to a static rule named <item>. In this example, the dynamic rule <<brand>> is coded with double brackets <<< >>> to advise the ASR engine that the dynamic rule must be matched before the static <command> rule can be matched, and the coding of the static rule parameter list (<item>) is coded with parentheses ( ) to advise the ASR engine (150) that the static <item> rule is to be matched before the dynamic <<brand>> rule is processed by the ASR engine.

The ASR engine (150) of FIG. 1 operates generally to carry out automatic speech recognition according to embodiments of the present invention by matching at least one static rule of a speech recognition grammar (104) with at least one word of a user's voice utterance, yielding at least one matched value, and dynamically defining at run time the dynamic rule of the grammar as a new static rule in dependence upon the matched value. The matched value is specified by the grammar to be required for processing of a dynamic rule (518) of the grammar. An example of a matched value in a static rule containing a dynamic rule reference for this example grammar:

```
<grammar id="exampleGrammar">
    <command> = add <<brand>>(<item>) <item> to my shopping list
    <item> = peppers | tomatoes | toothpaste
    <<brand>> = http://groceries.com/brand.jsp
</grammar>
``` is "peppers" when matched from a user utterance for the <item> rule. The matched value is specified by the grammar to be required for processing of the dynamic <<brand>> rule by the coding of the dynamic rule reference <<brand>> (<item>) in the static <command> rule.

The process of dynamically defining the dynamic rule as a new static rule may be carried out by the ASR engine (150) operating in conjunction with another computer resource that is specified in the definition of the dynamic rule (518) as a computer resource that is capable of dynamically defining at run time the dynamic rule of the grammar as a new static rule in dependence upon the matched value. In the exampleGrammar set forth above, the definition of the dynamic <<brand>> rule specifies the resource located by the URL http://groceries.com/brand.jsp as a computer resource that is capable of dynamically defining at run time the dynamic rule of the grammar as a new static rule in dependence upon a matched value of a static rule.

The multimodal application (195) is operatively coupled to the ASR engine (150). In this example, the operative coupling between the multimodal application and the ASR engine (150) is implemented either JVM (102), VoiceXML interpreter (192), or SALT interpreter (103), depending on whether the multimodal application is implemented in X+V, Java, or SALT. When the multimodal application (195) is implemented in X+V, the operative coupling is effected through the multimodal browser (196), which provides an operating environment and an interpreter for the X+V application, and then through the VoiceXML interpreter, which passes grammars and voice utterances for recognition to the ASR engine. When the multimodal application (195) is implemented in Java Speech, the operative coupling is effected through the JVM (102), which provides an operating environment for the Java application and passes grammars and voice utterances for recognition to the ASR engine. When the multimodal application (195) is implemented in SALT, the operative coupling is effected through the SALT interpreter (103), which provides an operating environment and an interpreter for the X+V application and passes grammars and voice utterances for recognition to the ASR engine.

The multimodal application (195) in this example, running on a multimodal device (152) that contains its own VoiceXML interpreter (192) and its own speech engine (153) with no network or VOIP connection to a remote voice server containing a remote VoiceXML interpreter or a remote speech engine, is an example of a so-called 'thick client architecture,' so-called because all of the functionality for processing voice mode interactions between a user and the multimodal application—as well as the functionality for automatic speech recognition with dynamic grammar rules according to embodiments of the present invention—is implemented on the multimodal device itself.

Figure 5:
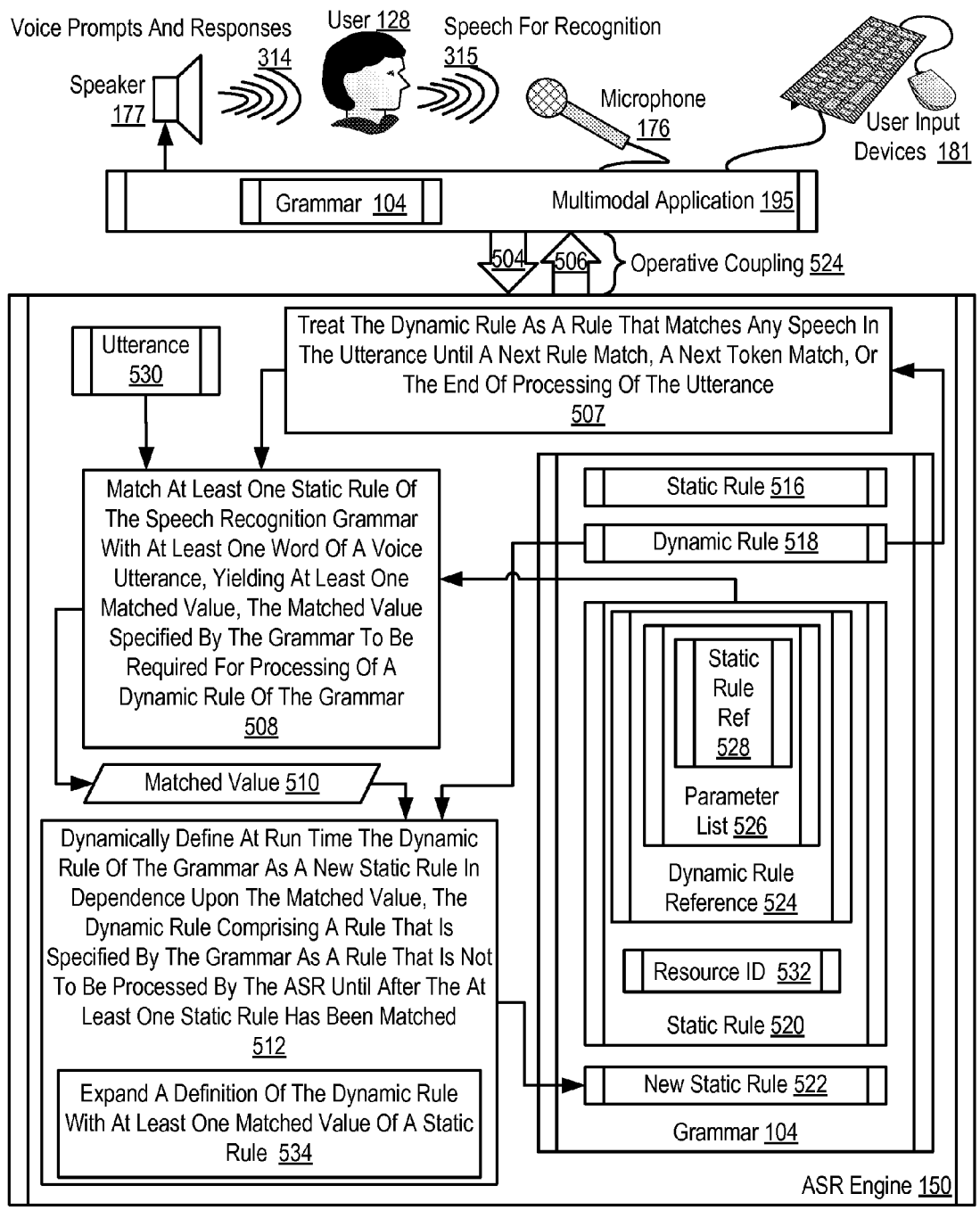
FIG. 5 sets forth a flow chart illustrating an exemplary method of automatic speech recognition according to embodiments of the present invention.

For further explanation, FIG. 5 sets forth a flow chart illustrating an exemplary method of automatic speech recognition according to embodiments of the present invention. Automatic speech recognition in this example is implemented with a speech recognition grammar (104) of a multimodal application (195) in an automatic speech recognition ('ASR') engine (150). The grammar (104) has been provided, along with one or more words in a user voice utterance (530), from the multimodal application (195) to the ASR engine (150) for recognition. The multimodal application (195) operates on a multimodal device (152 on FIG. 1) supporting multiple modes of user interaction with the multimodal application including a voice mode and one or more non-voice modes of user interaction with the multimodal application. The voice mode is represented in this example with audio output through a speaker (177) and audio input through a microphone (176). Non-voice modes are represented by user input devices (181), a keyboard and a mouse.

The multimodal application is operatively coupled (524) to the ASR engine (150). The operative coupling (524) provides a data communications path (504) from the multimodal application (195) to the ASR engine for speech recognition grammars. The operative coupling (524) provides a data communications path (506) from the ASR engine (150) to the multimodal application (195) for recognized speech and semantic interpretation results. The operative coupling may be effected with a JVM (102 on FIG. 4), VoiceXML interpreter (192 on FIG. 4), or SALT interpreter (103 on FIG. 4), when the multimodal application is implemented in a thick client architecture. When the multimodal application is implemented in a thin client architecture, the operative coupling may include an a voice services module (130 on FIG. 3) and a VOIP connection (216 on FIG. 3). When multimodal application is implemented in X+V, the operative coupling may include a VoiceXML interpreter (192 on FIG. 3). When the multimodal application is implemented in a Java speech framework, the operative coupling may include a Java speech API and a JVM (101, 102 on FIG. 3). When the multimodal application is implemented in SALT, the operative coupling may include a SALT interpreter (103 on FIG. 3).

The method of FIG. 5 includes matching (508) by the ASR engine (150) at least one static rule (520) of the speech recognition grammar (104) with at least one word of a voice utterance (530), yielding at least one matched value (510), where the matched value is specified by the grammar to be required for processing of a dynamic rule (518) of the grammar (104). The ASR engine uses a voice model and a lexicon to recognize the words in the voice utterance and then examines the rules of the grammar, generally in document order, to determine whether words and phrases in the utterance match any of the words and phrases specified in the rules of the grammar. In the following example grammar, referred to below in this specification as the "exampleGrammar":

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>,
``` the syntax <<brand>>(<item>) is a specification by the grammar that a matched value of the <item> rule is required for processing of the dynamic <<brand>> rule of exampleGrammar.

In the method of FIG. 5, the grammar (104) includes a rule reference specified by the grammar (104) to be a dynamic rule reference (524) to the dynamic rule (518). In the exampleGrammar, the rule reference <<brand>> in the static <command> rule is an example of a rule reference specified by the grammar to be a dynamic rule reference to a dynamic rule. In the example of FIG. 5, the dynamic rule reference (524) is characterized by a static rule parameter list (526) that includes at least one static rule reference (528) specifying at least one static rule required to be matched by the ASR engine (150) before processing the dynamic rule (518). In the exampleGrammar, the dynamic rule reference <<brand>> in the <command> rule is an example of a dynamic rule reference characterized by a static rule parameter list (<item>) that includes at least one static rule reference to the static <item> rule. The static rule reference to the <item> rule specifies a static rule, the <item> rule, that is required to be matched by the ASR engine (150) before processing the dynamic <<brand>> rule.

The method of FIG. 5 also includes dynamically defining (512) at run time the dynamic rule (518) of the grammar (104) as a new static rule (520) in dependence upon a matched value (510), that is, in dependence upon a matched value of a static rule specified in a static rule parameter list of a dynamic rule reference. The <command> and <item> rules in the exampleGrammar above are 'static' grammar rules. The static <item> rule in this example is equivalent to a traditional voice recognition grammar rule. According to embodiments of the present invention, however, 'static' rules, unlike traditional grammar rules, can also include dynamic rule references. The static <command> rule is an example of a static rule that includes a dynamic rule reference: <<brand>>(<item>).

In the method of FIG. 5, the grammar (104) includes a definition of the dynamic rule (518) that identifies a computer resource (532) capable of dynamically defining at run time the dynamic rule (518) of the grammar (104) as a new static rule (522) in dependence upon the matched value (510). In the exampleGrammar, the definition of the dynamic <<brand>> rule is an example of a definition of a dynamic rule that identifies a computer resource capable of dynamically defining at run time the dynamic rule of the grammar as a new static rule in dependence upon a matched value. The example dynamic rule definition is:

<<brand>>=http://groceries.com/brand.jsp, which uses a URL to identify a Java Server Page ('JSP') as a capable of dynamically defining at run time the dynamic rule of the grammar as a new static rule in dependence upon a matched value. Given the identity of such a computer resource, the ASR engine works in conjunction with the resource to domically define a new static rule from the dynamic rule at run time. The ASR engine may expand the definition of the dynamic rule with the matched value of the static rule and provide, to the computer resource specified in the definition of the dynamic rule, the expanded definition for use in dynamically defining a new static rule. Given the single static <item> item rule in the definition of the dynamic <<brand>> rule, for example, and an <item> rule match with the spoken word "peppers" the definition of the dynamic rule may be expanded as:

http://groceries.com/brand.jsp?item="peppers", and the new static rule returned from the JSP may be, for example:

<brand>=brand a|brand b|brand c

If the <item> rule were matched with "tomatoes," for example, then the definition of the dynamic <<brand>> rule may be expanded as:

http://groceries.com/brand.jsp?item="tomatoes", and the new static rule returned from the JSP may be, for example:

<brand>=brand f|brand g|brand h

If the <item> rule were matched with "toothpaste," for example, then the definition of the dynamic <<brand>> rule may be expanded as:

http://groceries.com/brand.jsp?item="toothpaste"

And the new static rule returned from the JSP may be, for example:

<brand>=colgate|palmolive|crest

And so on—with a different definition of the new static rule possible for each matched value of the referenced static <item> rule.

The examples just above describe a JSP as a computer resource capable of dynamically defining at run time the dynamic rule of the grammar as a new static rule in dependence upon a matched value, but the JSP is used only for explanation, not as a limitation of the present invention. A JSP is a dynamic server page, and other forms of dynamic server page may be used as a computer resource capable of dynamically defining at run time the dynamic rule of the grammar as a new static rule in dependence upon a matched value: Active Server Pages ('ASPs'), Common Gateway Interface ('CGI') scripts, PHP Hypertext Processor ('PHP') scripts, and so on. When a multimodal application is implemented as a Java application in a Java speech framework, then a computer resource capable of dynamically defining at run time the dynamic rule of the grammar as a new static rule may be implemented as a Java callback function. Computer resource capable of dynamically defining at run time the dynamic rule of the grammar as a new static rule may include dynamically linked native functions or local executable programs, with arguments marshalled according to the particular method. In addition, ECMAScripts in X+V pages may be used as computer resources capable of dynamically defining at run time the dynamic rule of the grammar as a new static rule in dependence upon the matched value, as in:

<<brand>>=getBrandNameScript, which may be expanded with a matched value, for example, as:

<<brand>>=getBrandNameScript("toothpaste").

And so on, so that many computer resources may be used for dynamically defining at run time the dynamic rule of the grammar as a new static rule in dependence upon a matched value, as will occur to those of skill in the art.

As mentioned earlier, a static rule parameter list may contain more than one static rule reference. If a dynamic rule reference in a static rule has more then one static rule reference, <rule1>, <rule2>, and so on, in its static rule parameter list, then the definition dynamic rule of the dynamic rule may be expanded, for example, as:

```
<<dynamicRule>> = http://someURL/query.jsp?rule1="interpretation of
   rule1";rule2="intepretation of rule2"; ...,
``` with one expansion term for each referenced static rule, and a new static rule may be generated for each static rule reference in the static rule parameter list using each match from each static rule referenced in the static rule parameter list. In the exampleGrammar, if the static rule parameter list for the <<brand>> reference contained more than one static rule reference, such as, for example:

```
<command> = add <<brand>>(<item1><item2> ... <itemN>) <item1>
   <item2> ... <itemN> to my shopping list,
``` then the definition of the dynamic <<brand>> rule may be expanded as:

```
http://groceries.com/brand.jsp?item1="match1"; item1 ="match1"; ...;
itemN="matchN",
``` and the new static rule returned from the JSP may in fact be a return of several static rules, one for each static rule reference in the static rule parameter list:

<item1>=term1|term2|term3

<item2>=term4|term5|term6|term7|term8

. . .

<itemN>=term22|term23|term24|term25

In the method of FIG. 5, the grammar may include more than one dynamic rule reference (524) to the dynamic rule (518), the dynamic rule references characterized by more than one static rule parameter list (526), and each static rule parameter list may include one or more static rule references (528) specifying one or more static rules required to be matched by the ASR engine (150) before processing the dynamic rule (518). That is, there may be in a static rule more than one dynamic rule reference to the same dynamic rule, and each such dynamic rule reference may specify different static rule references in its static rule parameter list. The follow static <command> rule, for example:

```
<command> = add ((<<brand>>(<beauty-item>) <beauty-item> |
   <<brand>>(<produce-item>) <produce-item>) [and])* to my
   shopping list,
``` sets forth two references to the dynamic <<brand>> rule:

<<brand>>(<beauty-item>) and <<brand>>(<produce-item>), and the static rule parameter lists for the two references are different. The dynamic rule reference <<brand>>(<beauty-item>) requires the ASR engine to match the static rule <beauty-item> before processing the dynamic <<brand>> rule, and the dynamic rule reference <<brand>>(<produce-item>) requires the ASR engine to match the static rule <produce-item> before processing the dynamic <<brand>> rule.

In the method of FIG. 5, the static rule (520) occurs in document order after the dynamic rule (518), and the method includes treating (507) the dynamic rule (518) as a rule that matches any speech in the utterance (530) until a next rule match, a next token match, or the end of processing of the utterance. ExampleGrammar is an example of a grammar in which a static rule containing a dynamic rule reference occurs in document order after the referenced dynamic rule:

```
<grammar id="exampleGrammar">
   <<brand>> = http://groceries.com/brand.jsp
   <command> = add <<brand>>(<item>) <item> to my shopping list
   <item> = peppers | tomatoes | toothpaste
</grammar>,
```

Also in exampleGrammar, the static rule referenced in the static rule parameter list (<item>) occurs in document order in the grammar after the dynamic rule that depends on the referenced static rule for processing by the ASR engine. So the ASR engine in this example has two reasons to treat the dynamic <<brand>> rule as continuing to match speech from the utterance currently being processed:

the ASR engine has not yet had the opportunity to process a static rule containing a dynamic rule reference to the <<brand>> rule, so the ASR engine has as yet no way of knowing, from the static rule parameter list (<item>), which static rule is to generate the match value required for processing of the dynamic <<brand>> rule, and the ASR engine has as yet no match value for use in processing the dynamic <<brand>> rule because the ASR engine has not yet processed the static <item> rule whose match value is required for processing of the dynamic <<brand>> rule.

In a traditional ASR engine, prior to this invention, the ASR engine, upon encountering a rule, such as the dynamic <<brand>> rule, that cannot be matched in document order, would stop processing and report a failure to match the grammar. The report could be an exception thrown in a Java environment, a <nomatch> event in X+V, and so on. In this example, however, an ASR engine according to embodiments of the present invention, upon encountering the dynamic <<brand>> rule, continues processing the grammar by treating the dynamic <<brand>> rule as a rule that matches any speech in the utterance currently processing until a next rule match, a next token match, or the end of processing of the utterance. A 'token' is a terminal grammar element. In the exampleGrammar, "add," "to," "my," "shopping," and "list" are tokens. So the ASR engine, upon encountering the dynamic <<brand>> rule, in effect, continues processing by matching arbitrary spoken input from the utterance (530) up to the next matched token, next matched rule, or until the ASR engine runs out of words in the utterance. The ASR engine may carry out such matching of arbitrary spoken input by treating arbitrary spoken input from the utterance as provisionally or temporarily generating a match value of NULL, for example. When the ASR engine does match a next matched token or rule of the grammar with spoken input from the utterance, the ASR engine continues processing by looping back through the grammar to again visit the dynamic <<brand>> rule.

Now the ASR engine knows from its encounter with the static <command> rule that processing the dynamic <<brand>> rule requires a matched value from the static <item> rule. If the ASR engine has such a matched value on its next loop through the grammar rules, the ASR engine can expand the definition of the <<brand>> rule and use the computer resource http://groceries.com/brand.jsp identified in the dynamic <<brand>> rule to dynamically define at run time the dynamic <<brand>> rule of the exampleGrammar as a new static rule in dependence upon the matched value.

For further explanation, a use case is now described for the exampleGrammar:

```
<grammar id="exampleGrammar">
    <<brand>> = http://groceries.com/brand.jsp
    <command> = add <<brand>>(<item>) <item> to my shopping list
    <item> = peppers | tomatoes | toothpaste
</grammar>,
``` processed by an ASR engine with the user's spoken utterance for recognition: "Add Crest toothpaste to my shopping list." The ASR engine treats the dynamic <<brand>> rule as matching <NULL>, matches "add to my shopping list" from the static <command> rule, and matches "toothpaste" from the static <item> rule. So the first pass on the grammar by the ASR engine recognizes "Add <NULL> toothpaste to my shopping list." With the match value "toothpaste" from the static <item> rule, the definition of the dynamic <<brand>> rule is expanded to http://groceries.com/brand.jsp?item="toothpaste." Execution of the computer resource identified in the definition of the dynamic <<brand>> rule yields the new static rule:

<brand>=Crest|Colgate|Aquafresh

A second pass of the recognizer matches the <NULL> component of the utterance against the newly static grammar rule, matching the word "Crest." The recognizer combines the results of the first and second pass and returns the combined recognition results to the multimodal application: "Add Crest toothpaste to my shopping list." The ASR engine thus can make an arbitrary number of passes over a single utterance to resolve multiple dynamic rules in a grammar.

Exemplary embodiments of the present invention are described largely in the context of a fully functional computer system for automatic speech recognition with dynamic grammar rules. Readers of skill in the art will recognize, however, that the present invention also may be embodied in a computer program product disposed on computer-readable signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for use in connection with automatic speech recognition, the method implemented at least in part by using an automatic speech recognition engine, the method comprising:

matching, by using at least one processor, at least one static rule of a speech recognition grammar with at least one word of a voice utterance yielding at least one matched value, the at least one static rule referenced in a parameter list of a dynamic rule of the speech recognition grammar, the parameter list occurring after the dynamic rule in the speech recognition grammar; and in response to the matching, obtaining a new static rule by processing the dynamic rule at least in part by using the at least one matched value, wherein the dynamic rule is not processed by the automatic speech recognition engine until after the at least one static rule has been matched.

2. The method of claim 1, further comprising treating the dynamic rule as a rule that matches any speech in the voice utterance until a next rule match, a next token match, or the end of processing of the voice utterance.

3. The method of claim 1, wherein the speech recognition grammar includes a definition of the dynamic rule that identifies a computer resource configured to dynamically define at run time the dynamic rule of the grammar as a new static rule in dependence upon the matched value.

4. The method of claim 1, wherein processing the dynamic rule comprises expanding a definition of the dynamic rule with the at least one matched value of the at least one static rule.

5. The method of claim 1, wherein the speech recognition grammar comprises a plurality of dynamic rule references to the dynamic rule, each of the plurality of dynamic rule references including a static rule parameter list comprising one or more static rule references specifying one or more static rules required to be matched before processing the dynamic rule.

6. An apparatus, comprising:
at least one computer processor configured to perform, at least in part by using an automatic speech recognition engine, acts of:
matching at least one static rule of a speech recognition grammar with at least one word of a voice utterance yielding at least one matched value, the at least one static rule referenced in a parameter list of a dynamic rule of the speech recognition grammar, the parameter list occurring after the dynamic rule in the speech recognition grammar; and
in response to the matching, obtaining a new static rule by processing the dynamic rule at least in part by using the at least one matched value,
wherein the dynamic rule is not processed by the automatic speech recognition engine until after the at least one static rule has been matched.

7. The apparatus of claim 6, wherein the at least one computer processor is further configured to treat the dynamic rule as a rule that matches any speech in the voice utterance until a next rule match, a next token match, or the end of processing of the voice utterance.

8. The apparatus of claim 6, wherein the speech recognition grammar includes a definition of the dynamic rule that identifies a computer resource configured to dynamically define at run time the dynamic rule of the speech recognition grammar as a new static rule in dependence upon the matched value.

9. The apparatus of claim 6, wherein processing the dynamic rule comprises expanding a definition of the dynamic rule with the at least one matched value of the at least one static rule.

10. The apparatus of claim 6, wherein the speech recognition grammar comprises a plurality of dynamic rule references to the dynamic rule, each of the plurality of dynamic rule references including a static rule parameter list comprising one or more static rule references specifying one or more static rules required to be matched before processing the dynamic rule.

11. At least one computer readable recordable storage medium storing computer program instructions that, when executed by at least one processor, cause the at least one processor to perform a method for use in connection with automatic speech recognition, the method implemented at least in part by using an automatic speech recognition engine, the method comprising:
matching at least one static rule of a speech recognition grammar with at least one word of a voice utterance yielding at least one matched value, the at least one static rule referenced in a parameter list of a dynamic rule of the speech recognition grammar, the parameter list occurring after the dynamic rule in the speech recognition grammar; and
in response to the matching, obtaining a new static rule by processing the dynamic rule at least in part by using the at least one matched value,
wherein the dynamic rule is not processed by the automatic speech recognition engine until after the at least one static rule has been matched.

12. The at least one computer readable recordable storage medium of claim 11, wherein the method further comprises treating the dynamic rule as a rule that matches any speech in the voice utterance until a next rule match, a next token match, or the end of processing of the voice utterance.

13. The at least one computer readable recordable storage medium of claim 11, wherein the speech recognition grammar includes a definition of the dynamic rule that identifies a computer resource configured to dynamically define at run time the dynamic rule of the speech recognition grammar as a new static rule in dependence upon the matched value.

14. The at least one computer readable recordable storage medium of claim 11, wherein processing the dynamic rule comprises expanding a definition of the dynamic rule with the at least one matched value of the at least one static rule.

15. The at least one computer readable recordable storage medium of claim 11, wherein the speech recognition grammar comprises a plurality of dynamic rule references to the dynamic rule, each of the plurality of dynamic rule references including a static rule parameter list comprising one or more static rule references specifying one or more static rules required to be matched before processing the dynamic rule.

* * * * *